Patented Jan. 19, 1954

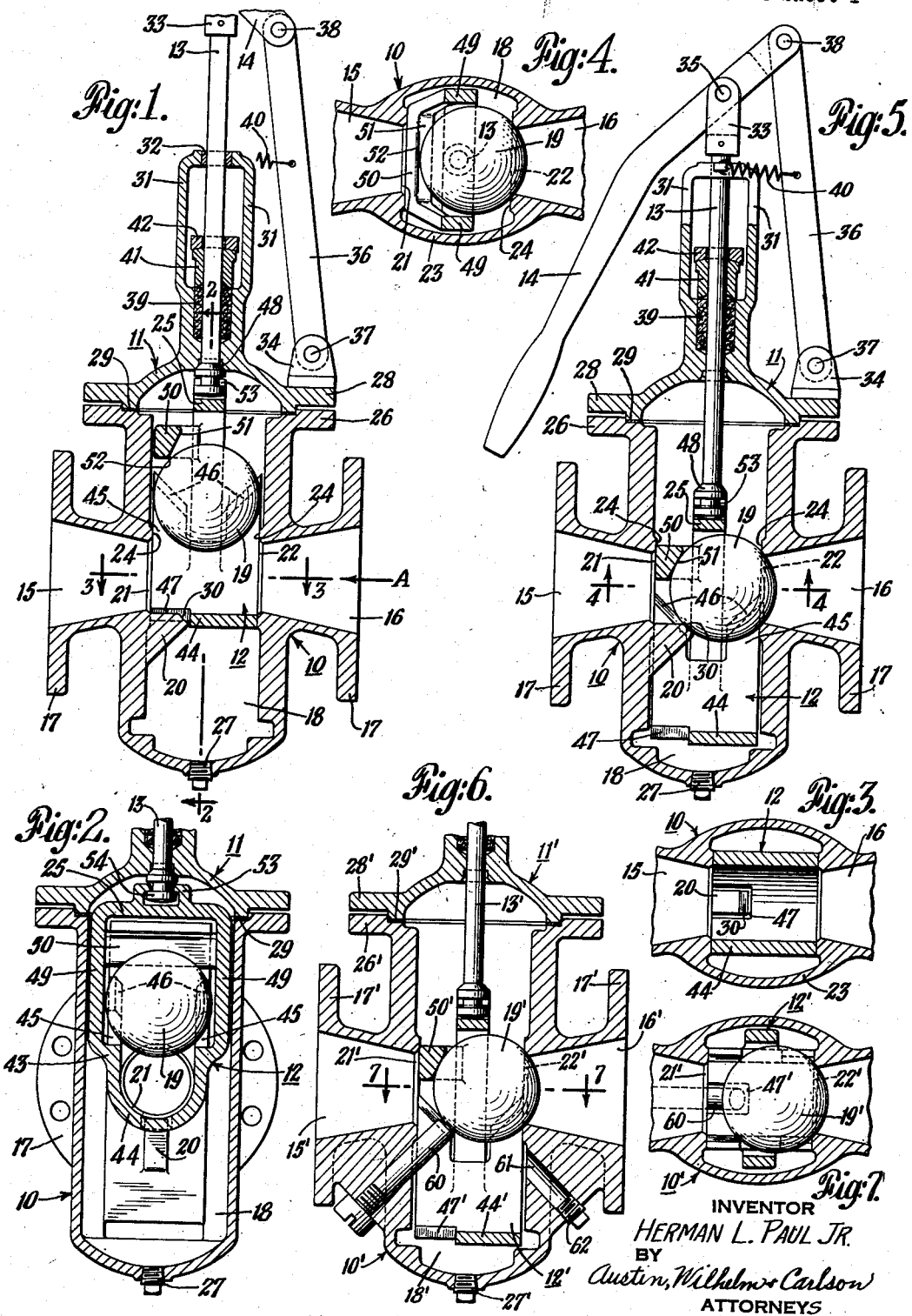

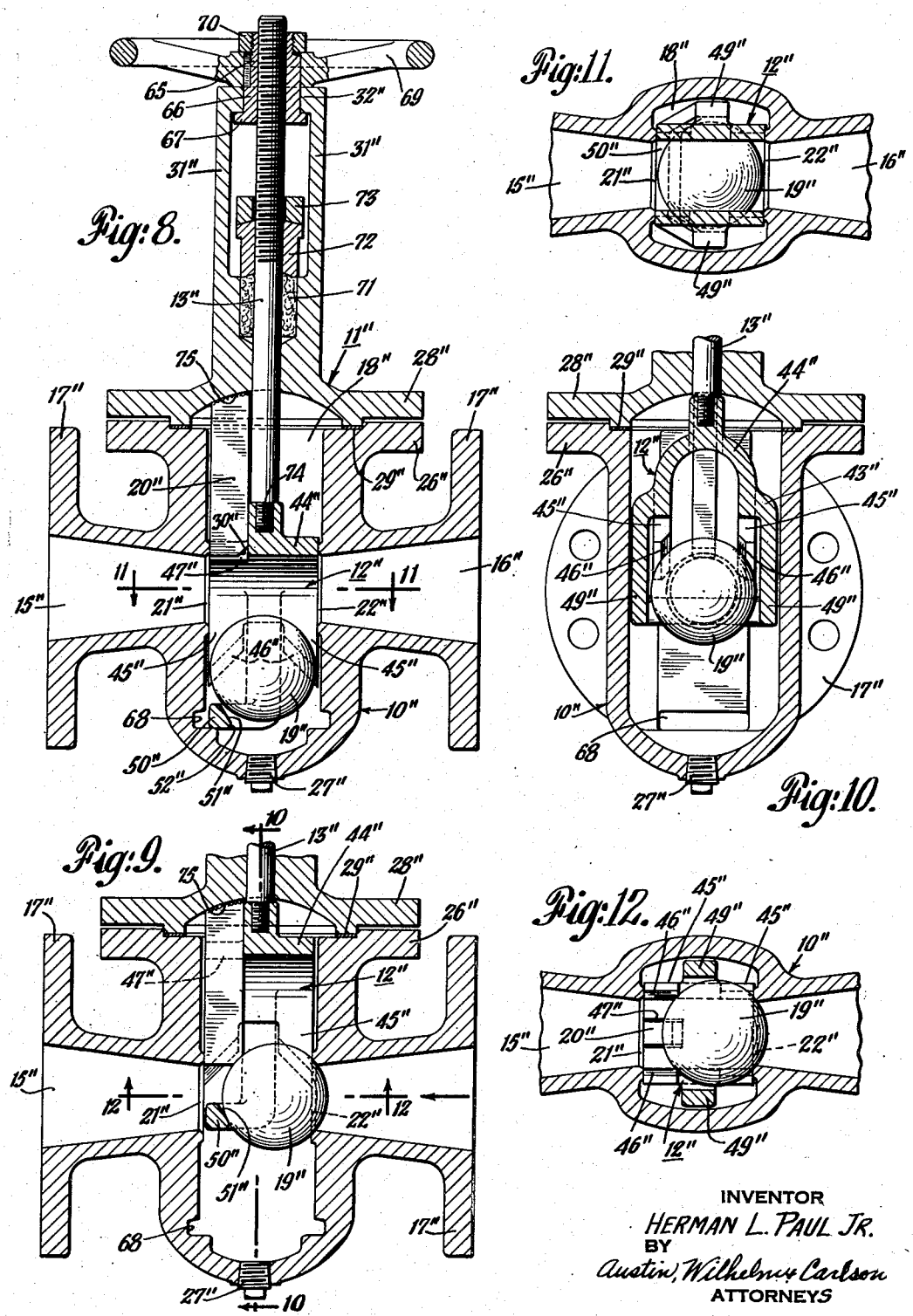

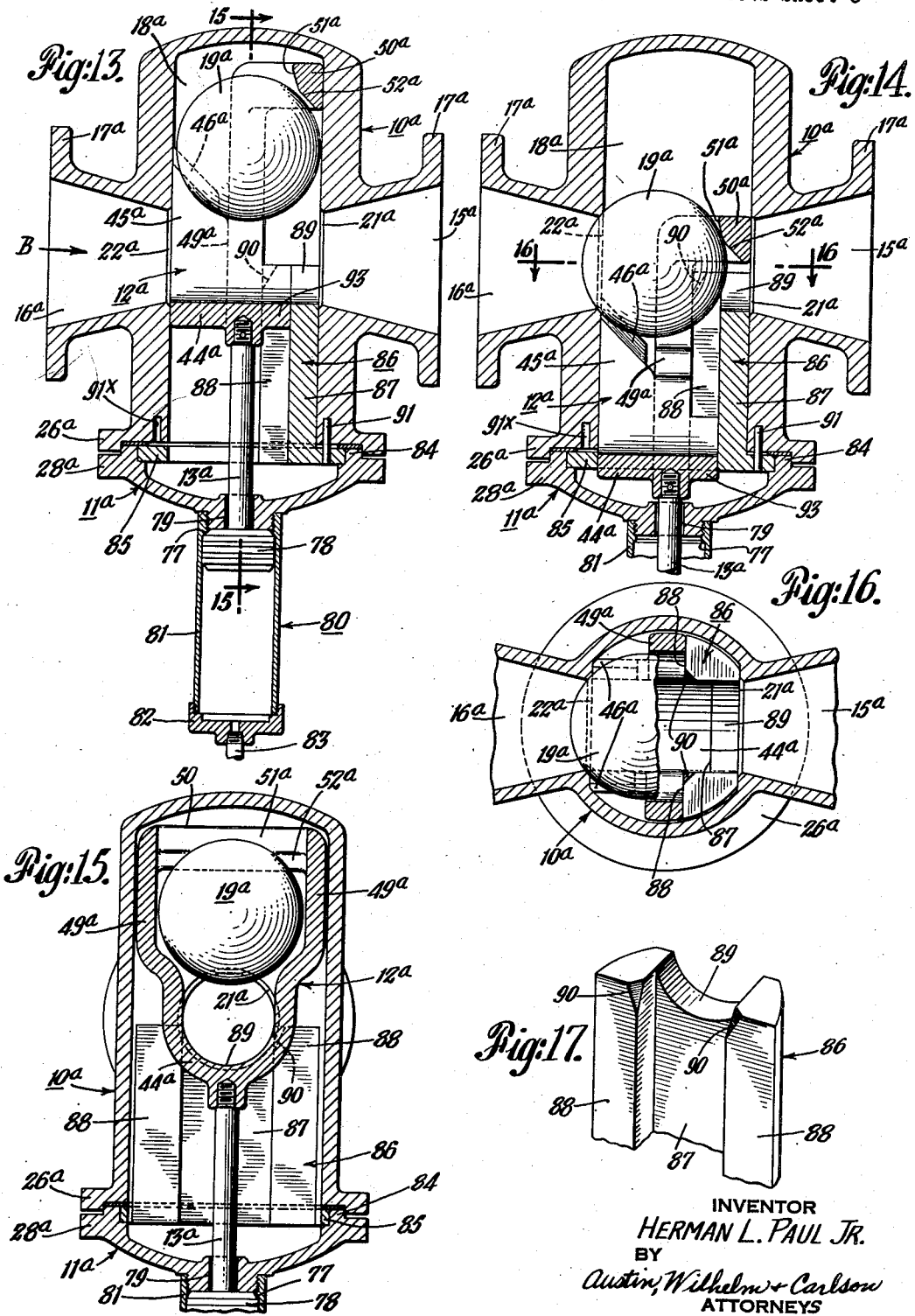

2,666,617

UNITED STATES PATENT OFFICE 2,666,617

BALL VALVE

Herman L. Paul, Jr., New Rochelle, N. Y., assignor to Paul Valve Corporation, Essex Fells, N. J., a corporation of New Jersey Application January 29, 1948, Serial No. 4,975

15 Claims. (Cl. 251—133)

The invention relates to controllable ball valves for controlling the flow of fluids.

The present invention constitutes an improvement over certain types of valves disclosed and claimed in application, Serial No. 730,317, filed February 24, 1947, now Patent No. 2,629,578, dated February 24, 1953.

The prior application discloses a valve having a straight fluid passage with converging and diverging walls forming a venturi. A recess intersects the straight fluid passage at the throat passage of the venturi forming in effect opposed throats or seats. A ball contained in the recess is moved by an actuator to open and close the valve. The actuator comprises a forked yoke having a hood portion straddling the flow space between the throats and bridging the throats to reduce turbulence. The yoke has wedges engageable between the ball and the seat to unseat the ball. The actuator also has a locking wedge for locking the ball against its seat. It has been found that, while such construction performs entirely satisfactorily when the seat, against which the ball normally seats and is locked, is on the down-stream side of the valve, it is often impossible to seat the ball against said seat when it is on the up-stream side of the valve.

It is an object of the present invention to adapt the above-mentioned valve to seat against the fluid pressure, i. e. against the up-stream seat. To accomplish this purpose, according to the invention, a stationary guide is so placed that, when the movable lock wedge moves toward closing position, the movable wedge and stationary guide cooperate to thrust the ball against the opposite seat, regardless of direction of fluid flow.

In accordance with the invention, the stationary guide may take the form of a stationary lug mounted on the valve casing, cast integral therewith; or the stationary guide may be in the form of a set screw threaded through the casing with its end disposed in the proper position. Or the stationary guide may be mounted on the valve bonnet either in the form of a casting integral with the bonnet or in the form of a bar welded to the bonnet. In other cases the stationary guide may take the form of an extra piece clamped between valve body and bonnet and having a depending forked portion with positioning wedges on either side of the flow space.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 1 is a vertical section through one form of valve showing the valve in full open position;

Fig. 2 is a transverse section on the line 2—2 of Fig. 1;

Fig. 3 is a horizontal transverse section on the line 3—3 of Fig. 1;

Fig. 4 is a horizontal section on the line 4—4 of Fig. 5;

Fig. 5 is a section corresponding to Fig. 1 but with the valve in closed position;

Fig. 6 is a vertical longitudinal section through a modified form of valve using a screw as the locking guide;

Fig. 7 is a horizontal section on the line 7—7 of Fig. 6;

Fig. 8 is a longitudinal vertical section of a modified form of valve showing the locking guide secured to the bonnet, the valve being in full open position;

Fig. 9 is a section corresponding to Fig. 8, showing the valve in closed position;

Fig. 10 is a section on the line 10—10 of Fig. 9;

Fig. 11 is a section on the line 11—11 of Fig. 8;

Fig. 12 is a section on the line 12—12 of Fig. 9;

Fig. 13 is a longitudinal vertical section of still a further modified form of valve in which the locking guide straddles the stream;

Fig. 14 is a view corresponding to Fig. 13 showing the valve in closed position;

Fig. 15 is a section on the line 15—15 of Fig. 13;

Fig. 16 is a section on the line 16—16 of Fig. 14; and

Fig. 17 is a perspective of the locking guide.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Figs. 1 to 5, the valve comprises, in general, a valve body 10 having a through fluid passage intersected by a transverse recess, the latter being closed by a bonnet 11. A forked actuator 12, operated by stem 13 and hand lever 14, engages the ball 19 to open and close the valve.

The valve body 10 has a straight-through passage made up of a converging conduit 16 and a diverging conduit 15, assuming the fluid flow to be in the direction of the arrow A. The converging conduit 16 and diverging conduit 15 may be of circular cross section throughout and of equal length. The valve body has conventional flanges 17 for coupling to connecting pipes (not shown) in any conventional manner, as by welding or by bolts.

The converging and diverging passages 16 and 15 form in effect a venturi whose throat space is intersected by the transverse recess 18. The end walls of the recess 18 are flat and have annular bosses 24. The surface of bosses 24 are plane and intersect the passages 15 and 16 to form circular throats 21, 22. Throat 22 is ground to form a conical seat for the ball; throat 21 is not ground. The side walls of the recess 18 are rounded as indicated at 23.

Formed integral with the valve body 10 is a lug 20 disposed adjacent throat 21 and having a guide surface 30; this guide surface cooperates with lock wedge 50 to guide and hold the ball 19 in its seat, as explained below. The lug 20 is entirely out of the flow space between the throats 21 and 22.

The valve body may have a drain hole at the bottom of recess 18 closed by threaded plug 27. The valve body has a top flange 26 to which the bonnet 11 is bolted.

The bonnet 11 has a base flange 28 with a circular projection seatable within a seat 29 on body flange 26. A plurality of bolts (not shown) pass through the flanges 26, 28 to hold the bonnet and valve body assembled, as will be understood by those skilled in the art.

Projecting upwardly from the base flange 28 are posts 31 supporting a bearing 32 at the top for slidable spindle 13. Pinned to spindle 13 is clevis 33. Secured to bonnet 11 is U-support 34. Lever handle 14 is pivoted to clevis 33 by pin 35. Link 36 is pivoted to support 34 by pin 37 and to handle 14 by pin 38. Tension spring 49 connects link 36 and a lug on bearing 32 to lock the valve in either full open position or in full closed position, as will be more apparent from further description.

Spindle 13 passes through a packing box 39 having suitable packing therein; the box is closed by gland 41 held in position by follower bar 42. Bar 42 is bolted to the bonnet 11 by bolts (not shown), as will be understood by those skilled in the art. The bonnet has a seat and spindle 13 has a disc 48 seatable in said seat to limit the open position of the spindle and, at the same time, to form a seal for the spindle.

Non-rotatably slidable in recess 18 is actuator 12, the top of which has a T-slot 53 to receive flange 54 on spindle 13. Actuator 12 comprises a yoke 43 having a hood portion 44 whose bottom inner surface is semi-cylindrical so that it may straddle the flow space between throats 21 and 22 and bridge the throats when the valve is in full open position. The hood 44 is laid out on the same radius as the smaller diameter of seat 22 (or on a slightly larger radius) and is substantially flush with the bottom and sides of the throats 21, 22, to provide confining walls for the main fluid stream passing through the valve and thus reduce turbulence. The hood 44 has a slot 47 in its edge to clear guide lug 20 (see Fig. 3).

The hood 44 terminates in four legs 45 whose ends have tapered end wedges or pads 46 engageable with the ball 19 for purposes hereinafter discussed more in detail. Also rising from the hood 44 are outwardly offset side stirrups 49; these support at their upper ends an offset lock bar 50 and the cross bar 25 on which the T-slot member 53 is mounted.

Lock bar 50 has a wedge surface 51 adapted to engage ball 19 to tightly wedge the ball against seat 22, as shown in Fig. 5. Lock bar 50 has a straight central portion engageable with the plane boss of throat 21, and bridging throat 21, to provide a backing for the action of wedge surface 51 when the ball is locked against seat 22. Lock bar 50 also has a riding surface 52 adapted to engage the ball 19 for positively pushing the ball; such positive operation of the ball may be necessary in cases when the valve is used in inverted position, in contrast with the upright position shown.

The angle of riding surface 52 is such as to produce no binding effect against the ball whenever it pushes the ball from its outermost position to its seating position, while the angle of locking wedge surface 51 is such as to wedge the ball tightly against its seat. The angle of wedge surface 51 may be greater or less than the critical angle, below which the friction between the wedge and the ball will hold the wedge in locked position without inward pressure being exerted on the spindle 13. In any event, sustained inward force on the spindle holds the wedge 50 in ball-locking position.

The angle of the opening wedges or pads 46 is such as to ease or roll the ball off its seat when opening the valve and to prevent spinning or chattering of the ball when the ball is held, in partially open or full open position, centered with respect to the four wedges 46. These wedges, as shown, have certain taper angles both in side elevation, as shown in Fig. 1, and in end elevation, as shown in Fig. 2, but these angles may vary considerably and still meet the requirements of ease in unseating the ball and of non-chattering and non-spinning. These wedges and the angles thereof are discussed more at length in the prior application referred to above.

To operate the valve shown in Figs. 1 to 5, it is only necessary to raise or lower the handle 14. The valve is shown in full open position in Fig. 1 with the lock bar 50 just clearing the ball 19 and with the disc 48 engaged in the bonnet seat. This limits the full open position of the yoke 43 to place the inside surfaces of the bottom and sides of the hood 44 approximately flush with the corresponding bottom and sides of throats 21 and 22 to obtain straight-through, unimpeded fluid flow through the valve. It will be noted that the spring 40 must be extended to operate the valve from full closed to full open position or vice versa. The lever arrangement is such as to cause the spring 40 to exert longitudinal force on the spindle 13—upwardly to hold the valve in full open position and downwardly to hold the valve in full closed and locked position.

The valve makes use of the Bernoulli theorem, according to which a member is always drawn from the edge of a flowing stream toward its middle by the faster flow and lower pressure there. The ball, being placed on the edge of the stream flow, tends to move to the center of the stream flow.

The Bernoulli effect, provided there is sufficient fluid velocity through the valve, normally holds the ball 19 centrally against the opening wedges 46, as shown in Figs. 1 and 2, even though the valve is used in inverted position. It will be noted that the ball, in full open position, projects slightly beyond the straight line connecting the tops of throats 21 and 22. This slight projection of the ball is for the purpose of engaging the ball with the vena contracta caused by the flow of fluid through the venturi. While the valve may be built to move the ball entirely clear of this throat space so it does not engage the vena contracta, and still utilize the Bernoulli effect, it has been found that the projection of the ball 19 to the edge of the vena contracta does not reduce fluid flow and has the advantage of reducing the maximum range of actuator movement between full open and full closed position.

To close the valve, it is only necessary to move the handle 14 downwardly to the position shown in Fig. 5. Assuming the fluid to be flowing in direction A, the fluid flow will tend to keep the ball 19 off its seat 22. Downward movement of the locking wedge 50 pushes the ball downwardly until it engages the guide surface 30 on the lock guide 20. The angle of the locking wedge and of the guide surface is such as to cooperate to thrust the ball onto its seat 22 against fluid flow and pressure; and thereafter the wedging action of the lock wedge surface 51 holds the ball there. This makes a drop-tight seal of the ball against its seat.

It will be understood that if the velocity of fluid flow be sufficient, the hydrodynamic lift will cause the ball to retain a position against the opening wedges 46, regardless of whether the valve is used in the position shown in Fig. 1 or inverted with respect thereto. If there is no fluid flow at all, or if the velocity is so small as to be insufficient to hold the ball against the opening wedges 46, the movement of the actuator is available to move the ball to closed position even against the force of gravity by the pushing action of the riding surface 52 and the actions of guide surface 30 and lock wedge surface 51, as described above.

To open the valve, it is necessary to raise hand lever 14 from the Fig. 5 position to the Fig. 1 position. With the fluid pressure in direction A, the fluid pressure will push the ball off its seat and thereafter the four opening wedges 46 will carry the ball to its full-open position. If the fluid pressure is counter to arrow A, the ball will remain seated until the opening wedge 46 on either side of seat 22 engage the ball. These wedges engage between the ball and the adjoining wall on either side of seat 22 and gently ease and roll the ball off its seat sufficiently to crack the valve. Further upward movement of actuator 12 moves the ball upwardly.

It will be noted that the point of tangency where the plane guide surface 30 touches the ball 19 when seated (see Fig. 5) is approximately diametrically across the ball from the top of the opposite seat 22. This geometrical relationship is desirable but not absolutely necessary so long as sufficient space is allowed between the guide surface 30 and the upper part of the opposite seat 22 to allow the ball to roll on to, and off of, its seat.

Referring now to Figs. 6 and 7, the lock guide here is in the form of a bolt 60 threaded into the body 10' in such position that the end surface of the bolt is in substantially the same position as guide surface 30 in Figs. 1 to 5. The body 10' is symmetrically drilled and threaded to provide a second hole 61 shown closed by a plug 62. This is for the purpose of utilizing both throats 21' and 22' which are ground to act as seats. After seat 22' is worn out, the valve body may be reversed in the pipe (not shown) to place seat 21' in the flow-wise position of seat 22'. To complete this changeover, it is only necessary to reverse the position of the actuator 12 with respect to the valve body and exchange bolt 60 and plug 62.

Referring now to Figs. 8 to 12, this form differs mainly from the previous described forms in that the guide wedge is secured to the bonnet. In this form the actuator is reversed from the position shown in Figs. 1 to 5 in that the locking wedge is on the opposite side of the ball from the operating spindle. In this form, instead of a lever operating mechanism, a conventional threaded spindle and hand wheel operator is used.

In Figs. 8 to 12 the body 10'' is substantially identical with the body 10 in Figs. 1 to 5, the main difference being in the absence of the integral guide lug 20. The parts of the body in this form are given, for convenience, the same reference numerals as corresponding parts in Figs. 1 to 5, but double primed, and will not be described again. Both throats 21'' and 22'' are ground to act as seats. Use is also made of the abutment formed by notch 68 as explained below.

The bonnet 11'' is similar to the bonnet 11 and has base flange 28'' with a circular projection seatable within the seat 29'' on the body flange 26''. A plurality of bolts (not shown) pass through the flanges 26'', 28'' to hold the bonnet and valve body assembled, as will be understood by those skilled in the art. Depending from bonnet 11'' is guide lug 20'' having guide surface 30'' corresponding to surface 30 in Fig. 1. This is discussed more at length below.

Projecting upwardly from the base flange 28'' are posts 31'' supporting a bearing 32'' at the top. Within bearing 32'' is a collar 65 having a rotatable journal 66 and an end flange 67. Hand wheel 69 is keyed to collar 65 and a nut 70 holds the hand wheel 69 and collar 65 in assembled relationship.

Spindle 13'' has threaded engagement with collar 65 and is non-rotatably mounted in actuator 12'' so that by turning hand wheel 69 the spindle 13'' may be made to rise and fall. Spindle 13'' passes through a packing box 71 having suitable packing therein. The box is closed by a gland 72 held in position by follower bar 73. Bar 73 is bolted to the bonnet 11'' by bolts (not shown), as will be understood by those skilled in the art.

Non-rotatably slidable in recess 18'' is the actuator 12'', the top of which has a hollow boss to receive the end of spindle 13''. A pin 74 passes through the boss and spindle to rigidly connect these parts.

Actuator 12'' comprises the yoke 43'' having a hood portion 44'' whose top inner surface is semi-cylindrical so that it may straddle the flow space between seats 21'' and 22'' and may bridge these seats when the valve is in full open position. The hood 44'' has a slot 47'' in its edge to clear the guide lug 20''. The hood 44'' is laid out on the same radius as the smaller diameters of seats 21'' and 22'' (or on a slightly larger radius), and is substantially flush with the top and sides of the seats 21″, 22″ to provide confining walls for the main fluid stream passing through the valve and thus reduce turbulence, when the valve is in full open position.

The hood 44″ terminates in four legs 45″ whose ends have tapered end wedges or pads 46″ engageable with the ball 19″ for purposes similar to those described in connection with Figs. 1 to 5. Depending from the hood 44″ are outwardly offset side stirrups 49″ supporting at their lower ends the offset lock bar 50″.

Lock bar 50″ has a wedge surface 51″ adapted to engage ball 19″ to tightly wedge the ball against seat 22″, as shown in Fig. 9. Lock bar 50″ has a straight central portion engageable with the plane boss of seat 21″, and bridging seat 21″, to provide a backing for the action of wedge surface 51″ when the ball is locked against seat 22″. Lock bar 50″ also has a riding surface 52″ adapted to engage the ball 19″ for manually raising the ball, when there is no fluid flow, or such low velocity flow, as to be insufficient to raise the ball to engage the opening wedges 46″. Lock bar 50″ engages abutment 68 to limit the opening movement of the actuator to such position the ball 19″ normally touches the vena contracta as explained above.

The angle of riding surface 52″ is such as to produce no binding effect against the ball as it is raised from its lowermost position to its uppermost position, while the angle of locking wedge surface 51 is such as to wedge the ball tightly against its seat. The angle of the wedge surface 51″ may be the same as that discussed in connection with wedge surface 51 of Figs. 1 to 5.

Cooperating with the locking wedge 50″ to thrust the ball against its seat is the guide bar 20″ shown connected to the bonnet 11″ by welding 75. Instead of being welded, this bar may be cast integral with the bonnet or otherwise secured. The bar depends centrally, as illustrated in Figs. 10 and 12, and is disposed in the notch 47″ of the hood. The bar has a wedge guide surface 30″ engageable with the ball to hold the ball in position so that the locking wedge can do its work when the valve is to be tightly closed.

To operate the form shown in Figs. 8 to 12, it is only necessary to rotate hand wheel 69 in the proper direction. Engagement of lock bar 50″ with shoulder 68 limits the full open position of the valve (Fig. 8). Full closed position of the valve occurs when the lock wedge 50″ is pressed home against the ball to hold the ball in its seat (Fig. 9).

In opening the valve, with fluid pressure holding the ball in its seat, the unseating of the ball by engagement of the opening wedges 46″ is the same as described in connection with the opening wedges 46 in Figs. 1 to 5; with fluid pressure tending to lift the ball from its seat, no opening wedge action is necessary.

The closing movement of the valve is similar to that described in connection with Figs. 1 to 5, the ball centering on the four wedges and rising with the actuator by action of the Bernoulli principle if there be sufficient fluid flow; if there be insufficient fluid flow, the ball will be lifted by the lock bar 50″. In either event, the ball is moved until it engages the wedging surface 30″ of the lock guide after which the locking wedge 50″ wedges the ball against its seat, regardless of the direction of fluid flow.

An advantage of the construction shown in Figs. 8 to 12 is that the symmetry of the valve body 10″ is unimpaired by the lock guide. Therefore, when the valve seat 22″, against which the ball normally seats, is worn, the valve may simply be reversed in its pipe and the other seat 21″ used, thus doubling the life of the valve body. In the event of reversal of the valve body in the pipe, appropriate reversal of the actuator and bonnet with respect to the valve body must also be made.

Referring now to the form shown in Figs. 13 to 17, here the valve body is shown inverted with respect to the positions shown in the preceding forms. The actuator is shown with its hood underneath its locking wedge (as in Figs. 1 to 5); and a servomotor, located under the valve, is shown for operating the actuator. This form distinguishes also from the preceding forms in that the actuator has a single pair of opening wedges and the lock guide is in the form of a hood-like member straddling the main stream flow (Fig. 17).

In Figs. 13 to 17 the valve body 10a is similar in construction to the valve body 10″ in Figs. 8 to 10, the principal differences being in the omission of the ledge 68 and of the drain plug 27″. The same reference characters as used in the preceding figures are used to denote corresponding parts in Figs. 13 to 17; these reference characters are supplemented by the character a to distinguish from the other forms. Therefore, the details of the body will not be described again.

The operating mechanism of Figs. 13 to 17 comprises a servomotor 80, one end of which constitutes a valve bonnet 11a. The motor includes a cylinder 81 threaded to the valve bonnet 11a. The cylinder has a head 82 threaded thereto. A fluid supply control pipe 83 connects with the lower end of the cylinder to operate the valve. Piston 78 is connected to stem 13a; this stem has a clearance space 79 where it passes through the bonnet 11a to pass operating fluid, as explained below. Piston 78 has a conical edge seatable in seat 77 in the end of cylinder 81 to provide a seal and to limit the upward movement of the piston.

The valve bonnet 11a has a flange 28a bolted to the flange 26a on the valve body, as will be understood by those skilled in the art. The bonnet 11a has a circular lip 84 seating in a circular recess in the valve flange 26a. Also seated in this recess is a ring 85 having a projecting trough-shaped guide member 86. A pin 91 passing through ring 85 and disposed in the body of the valve locates the guide member 86 in proper rotative position in the circular recess in the valve body 10a.

The trough-shaped member has a bottom wall 87 and side walls 88. The upper end of the trough bottom terminates in a hood whose surface 89 is rounded to register with the adjacent valve seat. The upper corners of the side walls of the trough have guide surfaces 90. These surfaces are disposed at such angle that they engage the ball substantially tangentially and outside of the main flow stream, as shown in Fig. 16, when the ball is seated.

The actuator 12a is similar to the actuator previously described in that it has a hood 44a having bottom and sides in register with the bottom and sides of the opposed seats 21a and 22a when the valve is in full open position. The hood has a single pair of legs 45a straddling the flow space between the valve seats, which legs terminate in opening wedges or pads 46a. These opening wedges have the same construction and the same relationship to the adjacent valve seat as the relation between the opening wedges and valve seats in the forms described above.

The hood 44a has a projecting portion 93 riding in the trough of the guide member 86 and has offset side stirrups 49a engaging the face of walls 88 of the guide member 86 (see Fig. 16).

Supported at the upper ends of the side stirrups 49a is an offset lock bar 50a having a wedge surface 51a adapted to engage the ball 19a to tightly wedge the ball against its seat, as shown in Fig. 14. The lock bar 50a has a straight central portion engageable with the plane boss of the seat 21a and bridging the seat to provide a backing for the action of the wedge surface when the ball is locked against the opposite seat 22a. The lock bar 50a also has a riding surface 52a for engaging the ball to positively move it toward closed position. The angles of the riding surface 52a and of the locking surface 51a may be the same as described in connection with Figs. 1 to 5.

The full open position of the valve is limited by the engagement of the piston 78 against the upper end of the cylinder of the servomotor (Fig. 13). In this position the hydrodynamic lift and also gravity, if the valve be used in the position shown, holds the ball centered with respect to its two opening wedges 46a and against the opposite wall of the valve body, as shown in Fig. 13. The locking wedge 50a is slightly spaced from the ball when in this position so as to allow the ball a certain freedom of movement.

The closed position of the valve is determined by the tight engagement of the locking wedge 50a against the ball 19a when the ball is seated in its seat 22a.

The operation of the form shown in Figs. 13 to 17 is as follows. It will be assumed that the valve controls water being delivered through the valve, in the direction B. Control pipe 83 is supplied with water from a suitable water supply; this pressure holds the valve open, as shown in Fig. 13.

To close the valve, pressure is released (by means not shown) in the control conduit 83. The pressure of the water flowing through the valve, acting on piston 78 (through clearance space 79) moves the actuator to closed position shown in Fig. 14. The cooperation of the locking wedge 50a and of the guide wedge surfaces 90 operates to thrust the ball 19a against its seat 22a, even though the ball must close against the fluid flow. Once the locking wedge has seated the ball tightly in its seat, the critical angle of lock wedge surface 51a is such as to hold the ball in locked position until the servomotor is again operated to open the valve.

To open the valve, water pressure is admitted to control pipe 83. This forces piston 78 upwardly, the upper end of the operator cylinder exhausting through clearance space 79 into the valve chamber. The opening wedges 46a ease the ball off its seat, if fluid pressure is holding the ball on its seat; otherwise fluid pressure against the ball unseats it and the ball is moved upwardly by the actuator.

It will be understood that suitable mechanical interlock (not shown) may also be provided for holding the actuator in locked or open position. Also, if desired, the servomotor may be modified so as to move the actuator in either direction independent of pressure of fluid flowing through the valve so that the valve may be closed or opened at will under all conditions.

This form of valve is also reversible in that when seat 22a is worn out, the actuator and lock guide may be reversed with respect to the valve body and the other seat 21a used. An extra opening 91x for pin 91 in the valve body diametrically opposite the position shown may be provided for the reversed position.

The present invention relates primarily to the auxiliary guide for assisting the locking wedge in positioning the ball against the upstream seat. Different forms of auxiliary guide are shown. Different operators for operating the actuator are also shown, such forms including the lever type operator, as shown in Figs. 1 to 5, the hand wheel type operator, shown in Figs. 8 to 12, and the servomotor type operator, shown in Figs. 13 to 17. It will be understood that the different types of operators are shown with different types of actuator and extra guide for purposes of illustration only and that the operators and actuators are interchangeable in that any of the operators shown for purposes of illustration, or in fact any commonly used operator, may be used with any of the different forms of actuator and auxiliary guide shown.

This type of valve is capable of general application regardless of direction or continuity of fluid flow; and regardless of position of valve (upright, inverted, on its side; in horizontal pipe or vertical pipe or inclined pipe). One use, for example, for this type of valve is in a vertical pipe where the fluid flow is normally vertically upward but may occasionally be downward. Here the valve would be so positioned as to seat the ball against the upper seat. This would place the ball on the normally down-stream seat, thus obtaining all the advantages of seating a ball with the pressure. The auxiliary guide would also insure seating with downward flow. Generally speaking, the present valve is good in all places where it is desired to seat against its seat, regardless of fluid conditions within the valve.

By the use of any of these valves, straight line throttling can be achieved. That is to say, the rate of flow through the valve is directly proportional to the amount of longitudinal displacement of the actuator from opening position. This follows from the nature of a ball rolling out of a circular seat and is made possible in the present valve by the location of all parts of the actuator out of the throat of the venturi so that the only impedence to fluid flow through the valve, between open and closed position, is the ball itself.

The proportions of these valves may vary somewhat but good results have been obtained by making the venturi ratio, that is the ratio of the diameter at the throat of the venturi to the maximum diameter of the venturi anywhere between 0.55 to 0.70. The ratio 5/8 is an ideal working ratio in most cases. Furthermore, the preferred ratio of the distance between seats to the larger venturi diameter is between 0.9 and 1.3. The venturi may be omitted entirely, if desired. In any event, best results have been obtained when the ball diameter is equal substantially to the distance between seats or throats.

The size of the valves themselves may vary anywhere from small hose valves to big power operated valves, such as used in powerhouse and industrial plants.

The valves have a wide range of uses and are useful for almost anything requiring a valve. They can handle lowest and highest pressures and temperatures. They can handle gases and liquids of a wide range of viscosities, including steam, air, oil, water and chemicals. Due to the easy action of the opening wedges, even large valves may be operated by hand. The valves may also be power operated and may be used as turbine trip, throttle valves, remote control, casualty valves, etc.

The hydrodynamic action according to the Bernoulli principle is obtainable over a wide range of fluid velocities and the Venturi principle, by increasing the throat velocity over and above velocity in the pipe, makes the Bernoulli lift effective over a greater range of pipe velocities.

Since the Bernoulli effect will lift large heavy metal balls, it will also lift any foreign matter which might settle out in the bottom of the valve when the valve is closed, thus making the valve self-flushing. This effect also prevents settling of foreign matter in the valve when fluid is flowing.

The Venturi shaped body reduces the physical dimensions of the valve for handling any given flow rate. The yoke and hood acts to reduce turbulence. Thus full pressure applied at the inlet of the valve is largely recovered at the outlet. The rate of discharge through the valve is also very high, as compared to an open pipe of the larger Venturi diameter.

The proper ratio of ball diameter to seat diameter insures tight seating and the ball, resting on a conical or convex seat, obtains ideal line contact. The fact that a ball never seats exactly in the same position on the seat insures long life to the ball.

The rolling of the ball from its seat by the opening wedges is accomplished with small effort and removes the ball without injury to the ball or seat. There is no danger of galling. The placing of the ball at the edge of the vena contracta in full open position minimizes the range necessary to operate the valve between full open and full closed positions.

When the hydrodynamic lift on the ball is great enough to "lift" the ball, the lifting force is sufficient to hold the ball firmly against the angular pads or wedges, producing enough surface friction on the ball to prevent spinning and fluttering. When the hydrodynamic lift is insufficient to lift the ball, the ball lies quietly in the bottom of the recess unless gravity holds the ball against its opening wedges. When the flow rate changes from the second condition to the first condition, as soon as sufficient lift is generated, the ball snaps from its position in the bottom of the recess up against the pads, the lift increasing as the ball moves upwardly. The Bernoulli effect is usable in all positions of the valve—in addition to upright as shown, inverted, on its side, etc.

The vital parts for sealing flow constitute the ball and its seat, both of which may be precision ground, thus insuring positive stoppage of flow. The seats may be integral with the valve body or they may be in the form of annular inserts.

High efficiency is obtained due to lack of turbulence and straight fluid flow. The present valves combine the high unit load, line contact seat seal of conventional globe and angle valves with the negligible pressure drop and through, non-turbulent flow of gate valves.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a valve, a casing having a flow passage and a recess intersecting said flow passage to form opposed throats, one of said throats constituting a seat, a ball in said recess seatable on said seat, an actuator in said recess movable generally lengthwise thereof, said actuator being in the form of a cage and having a yoke straddling the flow space between said throats, said yoke including a hood at its closed end and terminating in abutments, said yoke having side stirrups extending from said hood and a locking wedge connecting said stirrups, said ball being loosely confined between said abutments and said locking wedge, said locking wedge being engageable with said ball on the side of said ball remote from said seat, a guide member on said casing having a guide surface adjacent but substantially out of said flow space, said locking wedge and guide surface being located on opposite sides of the axis of said flow space, an operator for operating said actuator, said guide member cooperating with said locking wedge to thrust said ball against its seat.

2. In a valve, a casing having a flow passage with a transversely extending recess intersecting it and forming opposed throats, one of said throats forming a seat, a ball in said recess seatable on said seat, an actuator movable lengthwise of said recess and comprising a hood adapted to straddle the flow space between throats and also comprising legs, stirrups extending from said hood and also adapted to straddle said flow space, connecting means including a locking wedge located on the opposite side of said ball from said hood, said connecting means connecting said stirrups and forming with said legs a confining space for said ball, said actuator loosely engaging said ball to remove it from said seat and to lock the ball against its seat, an operating member connected to said connecting means for moving said actuator lengthwise of said recess, said locking wedge being engageable with the ball on the side of the ball remote from said seat.

3. In a valve, a casing having a flow passage with a transversely extending recess intersecting it and forming opposed throats, one of said throats forming a seat, a ball in said recess seatable on said seat, an actuator movable lengthwise of said recess and comprising a hood adapted to straddle the flow space between throats and also comprising legs, stirrups extending from said hood and also adapted to straddle said flow space, connecting means including a cross member connected to said stirrups said connecting means being disposed on the opposite side of said ball from said hood, said connecting means forming with said legs a space for positively moving said ball to seat and unseat the ball, an operating member connected to said cross member for moving said actuator lengthwise of said recess, said casing having an opening at the end of said recess remote from said hood, said operating member extending through said casing opening.

4. In a valve, a casing having a flow passage and a recess intersecting said flow passage to form opposed seats, one of said seats being for present use, the other being in reserve, a ball seatable on said used seat, an actuator in said recess, said actuator having a locking wedge, said locking wedge being engageable with said ball on the side of said ball remote from said used seat, a guide member mounted on said casing and having a guide surface adjacent but substantially out of said flow space, said guide surface cooperating with said locking wedge to thrust said ball against said used seat, means mounting said actuator to make it reversible with respect to said casing for the purpose of using said reserved seat.

5. In a valve, a valve body, a bonnet secured to said body, said body having a flow passage and a recess intersecting said flow passage to form opposed throats, one of said throats constituting a seat, a ball seatable on said seat, an actuator in said recess movable lengthwise thereof, said actuator being in the form of a cage and having a yoke straddling the flow space between said throats, said yoke including a hood at its closed end and terminating in legs, said yoke having side stirrups extending from said hood and a locking wedge connecting said stirrups, said ball being loosely confined between the ends of said legs and said locking wedge, said recess providing a receiving space for the ball and locking wedge when the valve is open, a guide member on said body having a guide surface adjacent but substantially out of said flow space, said guide surface being located on the opposite side of the axis of said flow space from said receiving space, said guide member cooperating with said locking wedge to thrust said ball against its seat, and means for operating said actuator.

6. In a valve, a casing having a flow passage and a recess intersecting said flow passage to form opposed seats, one of said seats being for present use, the other being in reserve, a ball seatable on said used seat, an actuator in said recess movable lengthwise thereof, said actuator having a locking wedge, said locking wedge being movable in a path located on the opposite side of said recess from said used seat, said casing having openings intersecting said recess at points outside of their respective seats and located on the opposite side of the flow space between seats from said locking wedge, a guide member disposed in the one of said openings on the opposite side of the recess from the used seat, the end of said guide member having a guide surface adjacent said flow space, said guide surface cooperating with said locking wedge to thrust said ball against said used seat, a closure for said other opening, said closure and guide member being exchangeable for the purpose of using said reserved seat, and means for operating said actuator.

7. In a valve, a casing having a flow passage and a recess intersecting said flow passage to form opposed seats, one of said seats being for present use, the other being in reserve, a ball seatable on said used seat, an actuator in said recess movable lengthwise thereof, said actuator being in the form of a cage and having a yoke straddling the flow space between said throats, said yoke including a hood at its closed end and terminating in legs, said yoke having side stirrups extending from said hood and a locking wedge connecting said stirrups, said ball being loosely confined between the ends of said legs and said locking wedge, said locking wedge being movable in a path located on the opposite side of said recess from the used seat, said casing having opposed diagonal openings intersecting said recess at points outside of their respective seats and located on the opposite side of said flow space from said locking wedge, a guide bolt threaded into the one of said openings on the opposite side of the recess from the used seat, the end of said bolt having a guide surface adjacent but substantially out of said flow space, said guide surface cooperating with said locking wedge to thrust said ball against said used seat, a closure for said other diagonal opening, said closure and guide bolt being exchangeable for the purpose of using said reserved seat, and means for operating said actuator.

8. In a valve, a valve body, a bonnet secured to said body, said body having a flow passage and a recess intersecting said flow passage to form opposed seats, one of said seats being for present use, the other seat being held in reserve, a ball seatable on said used seat, an actuator in said recess, said actuator having a locking wedge, a guide member on said bonnet having a guide surface adjacent the flow space between said seats, an operator for operating said actuator, said locking wedge being engageable with said ball on the side of the ball remote from said used seat, said guide member cooperating with said locking wedge to thrust said ball against said used seat, means removably mounting said bonnet on said body to enable the position of the bonnet and of the actuator with respect to said body to be reversed, to make use of the seat held in reserve.

9. In a valve, a casing having a flow passage and a recess intersecting said flow passage to form opposed throats, one of said throats constituting a seat, a ball seatable on said seat, an actuator in said recess movable lengthwise thereof, said actuator comprising a yoke straddling the flow space between said throats, said yoke including a hood at its closed end and terminating in a single pair of opening wedges located adjacent said seat, said yoke having side stirrups extending from said hood and a locking wedge connecting said stirrups, said ball being loosely disposed between said opening wedges and said locking wedge, a guide member having short legs straddling said flow space, said short legs having beveled guide surfaces to cooperate with said locking wedge to thrust said ball against said seat, said locking wedge and guide surfaces being engageable with the ball on the side of the ball remote from said seat.

10. In a valve, a casing having a substantially straight flow passage extending therethrough, said passage having a transversely extending recess intersecting it, said recess having opposed guide surfaces intersecting said passage to form opposed throats, at least one of said throats constituting a circular seat, a ball having a diameter substantially greater than the diameter of said seat and located in said recess, said opposed surfaces being spaced a distance approximately equal to the diameter of the ball, a locking wedge having a wedging surface, said locking wedge being movable generally lengthwise of said recess along the guide surface opposite said seat, said wedging surface being engageable with said ball on the far side of the ball from said seat, whereby said locking wedge exerts pressure against said ball to urge said ball against the surface adjacent said seat, said casing having a stop surface against which said locking wedge pushes the ball to positively thrust said ball onto said seat, whereby said ball may be seated against fluid pressure, and means for moving said locking wedge.

11. In a valve, a casing having a flow passage extending therethrough and a transversely extending recess intersecting said flow passage to form a seat, a ball in said recess seatable on said seat, an actuator in the form of a cage loosely confining said ball, said actuator comprising an opening wedge adapted to engage between the ball and the marginal wall surrounding the seat to unseat said ball against fluid pressure holding the ball on its seat, said actuator also comprising a locking wedge located on the opposite side of the ball from said opening wedge, said actuator being capable of moving said ball from open position in said recess on one side of the seat axis to closed position on said seat, said casing having a stop member located in said recess on the opposite side of the seat axis from said open position of the ball, said stop member being engaged by said ball when said actuator moves said ball to closed position and cooperating with said locking wedge to direct said ball onto said seat against fluid pressure, said locking wedge engaging said ball to hold it on said seat, and means for operating said actuator.

12. A controllable valve structure comprising a casing having a flow passage and an offset recess, said recess having opposed walls, at least one of said walls having a seat surrounding the flow passage, a loose ball in said recess and movable lengthwise thereof to open and close the valve, said recess having a receiving space to receive the ball when the valve is open, said opposed walls being spaced apart a distance generally equal to the ball diameter, an actuator in said recess, means for moving said actuator lengthwise of said recess to seat and unseat the ball, said casing having a stop member located in said recess on the opposite side of the seat axis from said receiving space, said stop member being located in the path of ball movement and engageable with the ball to limit movement thereof in a direction lengthwise of said recess, said actuator having a locking member engageable with the opposed wall opposite said seat and with that part of the ball surface adjacent said last-mentioned opposed wall and on the same side of the seat axis as said receiving space, whereby said locking member and stop member cooperate to thrust said ball against fluid pressure resisting seating of the ball.

13. A controllable valve structure comprising a casing having a flow passage and an offset recess, said recess having opposed guide surfaces, at least one of said guide surfaces having a seat surrounding the flow passage, a loose ball in said recess and movable lengthwise thereof along said guide surfaces to open and close the valve, said opposed guide surfaces being spaced apart a distance generally equal to the ball diameter, a set of locking members for positioning said ball on its seat against fluid pressure tending to unseat the ball, means for moving one of said locking members to engage the ball and to release the ball, said locking members being engageable with said ball on opposite sides thereof with respect to the length of said recess, at least one of said locking members being engageable with the ball on the opposite side thereof from the plane of said seat.

14. In a valve, a casing having a flow passage extending therethrough and a transversely extending recess intersecting said flow passage to form opposed orifices, at least one of said orifices being a circular seat, the part of said recess directly between said orifices constituting a stream space, a closure having a spherical surface seatable on said seat, a cage confining said closure but permitting rotation thereof to present different parts of said spherical surface to said seat, said cage comprising opening wedges adapted to engage the closure on either side of said stream space, to open said closure against fluid pressure holding said closure on its seat, said cage also comprising a locking member engaging said closure on the opposite side thereof from said opening wedges, said recess on one side of said stream space constituting a pocket to receive said closure in open position, said transversely extending recess having ways, said cage being slidable on said ways to move said closure from open position in said pocket to closed position on said seat, said casing having a stop member located in said recess on the opposite side of the seat axis from said pocket, said stop member being engaged by said closure, when the cage moves the closure to closed position, and cooperating with said locking member to direct said closure onto said seat against fluid pressure, and means for moving said cage along said ways.

15. In a valve, a casing having a flow passage and a recess intersecting said flow passage to form opposed seats, one of said seats being for present use, the other being in reserve, a ball seatable on said used seat, an actuator carrying a guide member in said recess, a second guide member mounted on said casing, said guide members cooperating with each other to thrust said ball against said used seat, at least one of said guide members being engageable with said ball on the side of the ball remote from said used seat, means mounting said last-named guide member to make it reversible with respect to said casing for the purpose of using said reserved seat.

HERMAN L. PAUL, JR.

References Cited in the file of this patent

UNITED STATES PATENTS

| Number | Name | Date |
|---|---|---|
| 414,509 | Fisher | Nov. 5, 1889 |
| 1,334,870 | Lowry | Mar. 23, 1920 |
| 1,588,562 | Vives | June 15, 1926 |
| 1,918,544 | House | July 18, 1933 |

FOREIGN PATENTS

| Number | Country | Date |
|---|---|---|
| 788,425 | France | of 1935 |